United States Patent
Tanaka et al.

(10) Patent No.: US 6,828,273 B2
(45) Date of Patent: Dec. 7, 2004

(54) HIGH ACTIVITY PHOTO-CATALYST

(75) Inventors: Jun Tanaka, Toyama (JP); Masayuki Sanbayashi, Toyama (JP); Yoshinori Ueyoshi, Toyama (JP); Hiroyuki Hagihara, Aichi (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/663,720

(22) Filed: Sep. 17, 2003

(65) Prior Publication Data

US 2004/0171484 A1 Sep. 2, 2004

Related U.S. Application Data

(62) Division of application No. 10/028,420, filed on Dec. 28, 2001.
(60) Provisional application No. 60/270,874, filed on Feb. 26, 2001.

(30) Foreign Application Priority Data

Dec. 28, 2000 (JP) .................................... P2000-402470
Dec. 21, 2001 (JP) .................................... P2001-388615
Dec. 25, 2001 (JP) .................................... P2001-390736

(51) Int. Cl.$^7$ ................................................ B01J 21/08
(52) U.S. Cl. ........................ 502/263; 502/150; 502/517
(58) Field of Search ................................. 502/263, 150, 502/517, 100, 300, 350

(56) References Cited

U.S. PATENT DOCUMENTS 5,759,948 A 6/1998 Takaoka et al.
6,180,548 B1 1/2001 Taoda et al.

FOREIGN PATENT DOCUMENTS

| EP | 0-963789 A2 | 12/1999 |
|---|---|---|
| EP | 1-052027 A1 | 11/2000 |
| EP | 1-064999 A1 | 1/2001 |
| EP | 1-118385 A1 | 7/2001 |
| EP | 1-147812 A1 | 10/2001 |
| EP | 1-153999 A1 | 11/2001 |
| JP | 9-296364 A | 11/1997 |
| JP | 10-244166 A | 9/1998 |
| JP | 11-156202 A | 6/1999 |
| JP | 11-302596 A | 11/1999 |
| JP | 11-309379 A | 11/1999 |
| JP | 2000-1631 A | 1/2000 |
| JP | 2000-218161 A | 8/2000 |
| JP | 2001-72419 A | 3/2001 |
| WO | WO 99/33566 A1 | 7/1999 |
| WO | WO 00/06300 A1 | 2/2000 |
| WO | WO 00/10706 A | 3/2000 |

OTHER PUBLICATIONS

Patent Abstract, abstracting JP A 2000–218161, Aug. 8, 2002.
Patent Abstract, abstracting JP A 2001–072419, Mar. 3, 2001.
Patent Abstract, abstracting JP A 11–309379, Nov. 9, 1999.
Patent Abstract, abstracting JP A 2000–1631, Jan. 7, 2000.
Patent Abstract, abstracting JP A 11–302596, Nov. 2, 1999.
Patent Abstract, abstracting JP A 11–156202, Jun. 15, 1999.
Patent Abstract, abstracting JP A 9–296364, Nov. 18, 1997.
Patent Abstract, abstracting WO A 00/10706, Mar. 2, 2000.

*Primary Examiner*—Stanley S. Silverman
*Assistant Examiner*—Edward M. Johnson
(74) *Attorney, Agent, or Firm*—Sughrue Mion, PLLC (57) ABSTRACT

When a polybasic acid salt containing at least one species selected from the group consisting of an alkaline earth metal, a transition metal, and Al is caused to be present on the surfaces of titanium dioxide fine particles, there are obtained photocatalytic particles and powder exhibiting sufficent photocatalytic properties when irradiated with light from a light source of low quantity of light. By use of the photofunctional particles and powder, an organic polymer composition, a slurry, a coating agent, and a product having a surface exhibiting photocatalytic property and hydrophilicity are obtained.

23 Claims, 2 Drawing Sheets

Fig. 1

Description of Reference Numerals

1. Nozzle section
2. Apparatus for pre-heating
3. Reaction tube
4. Bag filter

Fig. 2

HIGH ACTIVITY PHOTO-CATALYST

CROSS REFERENCE TO RELATED APPLICATION

This is a Divisional Application of pending prior application Ser. No. 10/028,420 filed Dec. 28, 2001; which claims benefit of Provisional Application No. 60/270,874, filed Feb. 26, 2001 the disclosures of which is incorporated herein by reference.

TECHNICAL FIELD

The present invention relates to a photocatalyst exhibiting high photoactivity. More particularly, the present invention relates to photocatalytic particles and a photocatalytic powder exhibiting sufficient photocatalytic properties when irradiated with light from a practical light source of low quantity of light, such as a fluorescent lamp; a material containing the particles or powder, such as an organic polymer composition, a slurry, a coating agent, or a film exhibiting photocatalytic property and hydrophilicity; and a product containing the particles or powder.

BACKGROUND ART

Conventionally, titanium oxide has been widely used in practice as a typical photocatalyst. Titanium oxide absorbs UV rays having a wavelength of about 400 nm or less, to thereby excite electrons thereof. When the resultant electrons and holes reach the surfaces of titanium oxide particles, the electrons and holes are combined with oxygen or water, thereby generating various radicals. The resultant radicals exert oxidizing effect to thereby oxidize and decompose substances adsorbed on the surfaces of the particles. Fundamentally, a titanium oxide photocatalyst functions as described above. Studies have been carried out on environmental purification utilizing such photo-functional properties of titanium oxide ultrafine particles, such as antibiosis, deodorization, antifouling, air cleaning, and water cleaning.

In order to improve the photocatalytic properties of titanium oxide particles, the following means have been proposed.

(1) Reduction of Particle Size

Reduction of particle size is very effective for preventing recombination of generated electrons and holes.

(2) Enhancement of Crystallinity

Enhancement of crystallinity is effective for increasing the rate of diffusion of generated electrons and holes toward the surfaces of particles.

(3) Separation of Electrons and Holes

Generated electrons and holes are separated from each other, to thereby increase the ratio of electrons or holes which reach the surfaces of particles.

(4) Regulation of Band Gap

When a band gap is reduced (i.e., maximum absorption wavelength is increased) through, for example, incorporation of small amounts of impurities, percent utilization of a light source containing small amounts of UV rays, such as sunlight or a fluorescent lamp, can be increased.

In order to attain the aforementioned means (4), recently, various studies have been performed on a photocatalyst which responds to visible light.

For example as disclosed in JP-A-9-262482 (the term "JP-A" as used herein means "unexamined published Japanese Patent Application"), anatase-type titanium dioxide of high catalytic activity is modified through ion implantation by use of a metal such as chromium (Cr) or vanadium (V), so as to shift the maximum light absorption wavelength of the titanium dioxide to a longer wavelength, thereby causing the titanium dioxide catalyst to function under irradiation with visible light. However, the aforementioned ion implantation by use of a metal requires a large, expensive apparatus and is industrially impractical.

JP-A-2001-72419 discloses titanium oxide designed such that, in the case where the half-width of the peak of titanium of the titanium oxide—which is present within the bond energy of 458 to 460 eV—is measured four times by means of X-ray photoelectron spectroscopy, when the average of the half-widths of the peak of titanium at the first and second measurement is represented by "A," and the average of the half-widths of the peak of titanium at the third and fourth measurement is represented by "B," the index X (i.e., B/A) becomes 0.97 or less. However, since powder of the titanium oxide has low activity and is colored, application of the titanium oxide powder is limited. Therefore, the powder is not suitable for use in a coating material which requires transparency.

Conventional photocatalysts which respond to visible light are difficult to use in practice, since they require a strong light source such as a xenon lamp in order to exhibit their catalytic properties sufficiently. Therefore, it would be greatly advantageous to provide a photocatalyst which exerts sufficient effects when irradiated with light from a conventional inexpensive light source; for example, a light source used in a room, such as a day white fluorescent lamp.

International Patent Publication WO94/11092 discloses a method for treating bacteria or malodorous substances by applying a photocatalytic thin film containing a semiconductor of, for example, titanium dioxide onto the inner wall of a sickroom or a residential space. However, the publication does not disclose a method for imparting activity to titanium dioxide and the photocatalytic activity of particles of the titanium dioxide. Provided that typical titanium dioxide is employed, when the photocatalytic thin film is irradiated with light from a light source containing small amounts of UV rays, such as a fluorescent lamp, the activity of the thin film is expected to be lower than that of the aforementioned visible-light-response-type photocatalyst.

Attempts to utilize photocatalytic properties of titanium oxide fine particles have led to proposals of a method of kneading titanium oxide fine particles into an easily handled medium such as a fibrous material or a plastic formed article, and a method of applying the fine particles to the surface of a substrate such as cloth or paper. However, not only harmful organic substances or environmental contaminants, but also media such as fiber, plastic, and paper are easily decomposed and impaired by the strong photocatalytic action of titanium oxide, and, in view of durability, this stands as an obstacle to practical use. Also, since titanium oxide fine particles are easily handled, a coating material prepared by mixing titanium oxide fine particles and a binder has been developed. However, an inexpensive binder exhibiting the durability sufficiently high to overcome the problem (obstacle) of action on the media has not yet been found.

JP-A-9-225319 and JP-A-9-239277 disclose a technique of preventing and suppressing the deterioration of a resin medium or a binder that would otherwise occur because of the strong photocatalytic action of titanium oxide particles, where there is proposed, as means therefor, a method of bearing a photoinactive compound containing an element such as aluminum, silicon, or zirconium on the surfaces of titanium oxide particles such that the compound assumes a form of archipelago with steric hindrance to thereby suppress the photocatalytic action. However, this method is disadvantageous in that, although the photoinactive compound is supported so as to form an archipelago form, a portion subjected to the strong photocatalytic activity of titanium dioxide is present at a specific site of the resin medium or binder.

JP-A-10-244166 proposes photocatalytic titanium oxide prepared by coating the surface of titanium oxide with porous calcium phosphate. However, in this case, as has been pointed out, the photocatalytic performance decreases because of the coating film; i.e., the calcium phosphate layer.

International Patent Publication WO99/33566 discloses a titanium dioxide fine particle powder where a porous calcium phosphate coating layer is formed at least on a portion of the surfaces of titanium dioxide fine particles, and an anionic surfactant is present in the interface between the layer and the surface of the fine particles.

With respect to a slurry containing titanium oxide having photocatalytic activity, JP-A-10-142008 discloses an anatase-type-titanium-oxide-containing slurry obtained by subjecting a titania sol solution, a titania gel, or a titania sol·gel mixture to heat treatment and pressure treatment in a closed container, and then to dispersion using ultrasonic waves or stirring.

JP-A-11-343426 discloses a photocatalytic coating material having excellent dispersion stability, which is a photocatalytic coating material containing titanium oxide and silica sol in a solvent, where the titanium oxide has a Raman spectrum peak in the range from 146 to 150 $cm^{-1}$, and anatase-type titanium oxide accounts for 95 mass % or more of the titanium oxide.

As described above, although several techniques have been disclosed, there have not yet been provided, in an industrially useful manner, photocatalytic powder and slurry which exhibit photocatalytic properties and which satisfy requirements for both durability and dispersion stability when used in combination with an organic material.

DISCLOSURE OF THE INVENTION

In view of the foregoing, an object of the present invention is to provide photocatalytic particles and a photocatalytic powder exhibiting sufficient photocatalytic properties when irradiated with light from a practical light source of low quantity of light, such as a fluorescent lamp; a material containing the particles or powder, such as an organic polymer composition, a slurry, a coating agent, or a film exhibiting photocatalytic property; and a product containing the particles or powder. The composition and the film undergo a minimum level of coloring, and the film has high transparency.

Another object of the present invention is to provide a photocatalytic powder which exhibits excellent dispersion stability without impairing the photocatalytic property of titanium dioxide, and which has excellent industrial applicability; a slurry containing the powder; a polymer composition containing the powder; a coating agent containing the powder; a photocatalytic formed article containing the powder; and a photocatalytic structure containing the powder.

The present invention provides a photocatalytic powder and a photocatalytic slurry which exhibit excellent photocatalytic property, durability, and dispersion stability when applied to the coating of a material such as fiber, paper, or plastic; when kneaded into such a material; and when used in a coating material composition.

The present inventors have performed extensive studies and have attained the aforementioned objects by forming photocatalytic particles exhibiting high activity even when irradiated with light from a light source of low quantity of light, and by inventing a photocatalytic powder and a slurry containing the powder, the powder being characterized in that a polybasic acid salt containing at least one species selected from the group consisting of alkaline earth metals, transition metals, and Al is present on the surfaces of the aforementioned titanium dioxide fine particles of high activity.

Accordingly, the present invention provides the following.

(1) Photocatalytic particles characterized in that, in 5 L of dry air containing 20 ppm acetaldehyde, after 3.5 g of the particles that have been uniformly applied onto a plane having a diameter of 9 cm are irradiated with light for one hour by use of a day white fluorescent lamp such that the intensity of UV rays of 365 nm is 6 $\mu W/cm^2$, percent decomposition of the acetaldehyde is at least about 20%.

(2) Photocatalytic particles according to (1), wherein the percent decomposition is at least about 40%.

(3) Photocatalytic particles according to (2), wherein the percent decomposition is at least about 80%.

(4) Photocatalytic particles according to any one of (1) through (3), which comprise titanium dioxide.

(5) Photocatalytic particles according to (4), wherein the titanium dioxide has a BET specific surface area of about 10 to about 300 $m^2/g$.

(6) Photocatalytic particles according to (5), wherein the titanium dioxide contains an anatase-type crystal form.

(7) Photocatalytic particles according to (5), wherein the titanium dioxide contains a brookite-type crystal form.

(8) Photocatalytic particles according to (5), wherein the titanium dioxide contains a rutile-type crystal form.

(9) Photocatalytic particles according to (5), wherein the titanium dioxide contains at least two crystal forms selected from among anatase, rutile, and brookite.

(10) Photocatalytic particles according to any one of (6) through (9), which are composite particles containing the titanium dioxide and photocatalytically inactive ceramic.

(11) Photocatalytic particles according to (10), wherein the photocatalytically inactive ceramic is present partially on the surfaces of titanium dioxide particles.

(12) Photocatalytic particles according to (10) or (11), wherein the photocatalytically inactive ceramic is a salt containing at least one species selected from the group consisting of an alkaline earth metal, a transition metal, and Al.

(13) Photocatalytic particles according to (12), wherein the alkaline earth metal is at least one species selected from the group consisting of Mg and Ca.

(14) Photocatalytic particles according to (12), wherein the transition metal is at least one species selected from the group consisting of Fe and Zn.

(15) Photocatalytic particles according to (12), wherein the salt containing an alkaline earth metal or a transition metal is selected from among a phosphate, a condensed phosphate, a borate, a sulfate, a condensed sulfate, and a carboxylate.

(16) Photocatalytic particles according to (15), wherein the condensed phosphate is at least one salt selected from the group consisting of a pyrophosphate, a tripolyphosphate, a tetrapolyphosphate, a metaphosphate, and an ultraphosphate.

(17) Photocatalytic particles according to (10) or (11), wherein the photocatalytically inactive ceramic is at least one species selected from the group consisting of an Si compound, an Al compound, a P compound, an S compound, and an N compound.

(18) Photocatalytic particles according to any one of (10) through (17), wherein the composite particles have a BET specific surface area of about 10 to about 300 m²/g.

(19) Photocatalytic particles according to any one of (1) through (18), which have an isoelectric point of about 4 or less obtained on the basis of a zeta potential as measured by means of an electrophoresis light-scattering method.

(20) A photocatalytic powder comprising photocatalytic particles as recited in any one of (1) through (19).

(21) An organic polymer composition comprising photocatalytic particles as recited in any one of (1) through (19).

(22) An organic polymer composition according to (21), wherein the organic polymer of the composition is at least one species selected from the group consisting of a thermoplastic resin, a thermosetting resin, a synthetic resin, a natural resin, and a hydrophilic polymer.

(23) An organic polymer composition according to (21), which is at least one species selected from the group consisting of a coating material, a coating composition, a compound, and a masterbatch.

(24) An organic polymer composition according to any one of (21) through (23), which contains the photocatalytic powder in an amount of about 0.01 to about 80 mass % on the basis of the entire mass of the composition.

(25) A photocatalytic formed article which is formed from an organic polymer composition as recited in any one of (21) through (24).

(26) A photocatalytic formed article according to (25), which is at least one formed article selected from the group consisting of fiber, film, and plastic.

(27) A product which is produced from a photocatalytic formed article as recited in (26).

(28) A product comprising, on its surface, photocatalytic particles as recited in any one of (1) through (19).

(29) A product according to (27) or (28), which is at least one member selected from the group consisting of building materials, machinery, vehicles, glass products, electric appliances, agricultural materials, electronic apparatus, tools, tableware, bath products, toiletry products, furniture, clothing, cloth products, fibers, leather products, paper products, sporting goods, futon, containers, eyeglasses, signboards, piping, wiring, brackets, sanitary materials, and automobile parts.

(30) A slurry comprising photocatalytic particles as recited in any one of (1) through (19).

(31) A slurry comprising photocatalytic particles, wherein a powder obtained by drying the slurry is photocatalytic particles as recited in any one of (1) through (19).

(32) A slurry according to (30) or (31), which contains water as a solvent.

(33) A slurry according to (30) or (31), which contains photocatalytic particles in an amount of about 0.01 to about 50%.

(34) A slurry according to (30) or (31), which has a pH of about 4 to about 10.

(35) A slurry according to (34), which has a pH of about 6 to about 8.

(36) A slurry according to any one of (30) through (35), wherein, when the slurry contains the photocatalytic particles in an amount of 10%, the slurry has a transmittance of at least about 10% as measured at a wavelength of 550 nm and an optical length of 2 mm.

(37) A slurry according to (36), which has a transmittance of at least about 30%.

(38) A coating agent comprising photocatalytic particles as recited in any one of (1) through (19) and a binder, which is to be formed into a film exhibiting photocatalytic property.

(39) A coating agent comprising a slurry as recited in any one of (30) through (37) and a binder, which is to be formed into a film exhibiting photocatalytic property.

(40) A coating agent according to (38) or (39), wherein the binder contains an organic compound.

(41) A coating agent according to (40), wherein the organic compound is at least one species selected from the group consisting of acrylsilicon, polyvinyl alcohol, melamine resin, urethane resin, acrylurethane, celluloid, chitin, starch sheet, polyacrylamide, and acrylamide.

(42) A coating agent according to (38) or (39), wherein the binder contains an inorganic compound.

(43) A coating agent according to (42), wherein the inorganic compound is at least one species selected from the group consisting of a Zr compound, an Si compound, a Ti compound, and an Al compound.

(44) A method for forming a film exhibiting photocatalytic property, comprising applying a coating agent onto an object, and hardening the resultant film, wherein the film is hardened at a temperature of about 500° C. or lower, and the coating agent is a coating agent as recited in any one of (38) through (43).

(45) A method for forming a film exhibiting photocatalytic property according to (44), wherein the hardening temperature is about 200° C. or lower.

(46) A method for forming a film exhibiting photocatalytic property according to (45), wherein the hardening temperature is about 30° C. or lower.

(47) A product comprising a film exhibiting photocatalytic property, wherein the film is formed through a method as recited in any one of (44) through (46).

(48) A product comprising a film exhibiting photocatalytic property, characterized in that, in 5 L of dry air containing 60 ppm hydrogen sulfide, after the film having a surface area of 400 cm² is irradiated with light for four hours by use of a day white fluorescent lamp such that the intensity of UV rays of 365 nm is 6 $\mu$W/cm², percent decomposition of the hydrogen sulfide is at least about 20%.

(49) A product according to (47) or (48), wherein the film exhibiting photocatalytic property has a thickness of about 0.01 to about 100 $\mu$m.

(50) A product according to (49), wherein the film thickness is about 0.01 to about 0.1 $\mu$m.

(51) A product according to (49), wherein the film thickness is about 1 to about 100 $\mu$m.

(52) A product comprising a film exhibiting photocatalytic property according to (47) or (48), wherein, when transmittance at 550 nm in the absence of a film exhibiting photocatalytic property is represented by "T1%," and transmittance at 550 nm in the presence of the film is represented by "T2%," the product has a portion at which the ratio of T2/T1 is at least about 0.9.

(53) A product comprising a film exhibiting photocatalytic property according to (47) or (48), wherein, when light reflectivity at 550 nm in the absence of a film exhibiting photocatalytic property is represented by "R1%," and light reflectivity at 550 nm in the presence of the film is represented by "R2%," the product has a portion at which the ratio of R2/R1 is at least about 0.9.

(54) A product according to any one of (47) through (53), wherein the film exhibiting photocatalytic property has a pencil hardness of at least 2H.

(55) A product according to any one of (47) through (54), wherein, after the film exhibiting photocatalytic property is irradiated with light for 24 hours by use of a day white fluorescent lamp such that the intensity of UV rays of 365 nm is 6 $\mu W/cm^2$, the film has a contact angle of about 20° or less with respect to water.

(56) A product according to (55), wherein the contact angle with respect to water is about 100 or less.

(57) A product according to (56), wherein the contact angle with respect to water is about 5° or less.

(58) A product according to any one of (47) through (57), wherein, after the film exhibiting photocatalytic property is irradiated with light for 24 hours by use of a day white fluorescent lamp such that the intensity of UV rays of 365 nm is 6 $\mu W/cm^2$, and then allowed to stand in the dark for 24 hours, the film has a contact angle of about 20° or less with respect to water.

(59) A product according to (58), wherein, after the film is allowed to stand in the dark for 24 hours, the film has a contact angle of about 10° or less with respect to water.

(60) A product according to (59), wherein, after the film is allowed to stand in the dark for 24 hours, the film has a contact angle of about 5° or less with respect to water.

(61) A product according to any one of (47) through (60), wherein, after the film exhibiting photocatalytic property is subjected for 4,000 hours to an acceleration-exposure test employing a xenon arc lamp, the film has a yellowing degree of about 10 or less, and after the film is irradiated with light for 24 hours by use of a day white fluorescent lamp such that the intensity of UV rays of 365 nm is 6 $\mu W/cm^2$, the film has a contact angle of about 20° or less with respect to water.

(62) A product according to any one of (47) through (61), wherein the film exhibiting photocatalytic property is formed on an inorganic substrate.

(63) A product according to (62), wherein the inorganic substrate is of metal or ceramic.

(64) A product according to (62), wherein the inorganic substrate is at least one species selected from the group consisting of an Si compound and an Al compound.

(65) A product according to any one of (47) through (61), wherein the film exhibiting photocatalytic property is formed on an organic substrate.

(66) A product according to (65), wherein the organic substrate is an organic polymer.

(67) A product according to (66), wherein the organic polymer is at least one species selected from the group consisting of polyethylene, polypropylene, polystyrene, nylon 6, nylon 66, aramid, polyethylene terephthalate, unsaturated polyesters, polyvinyl chloride, polyvinylidene chloride, polyethylene oxide, polyethylene glycol, silicon resin, polyvinyl alcohol. vinylacetal resin, polyacetate, ABS resin, epoxy resin, vinyl acetate resin, cellulose derivatives such as cellulose and rayon, urethane resin, polyurethane resin, polycarbonate resin, urea resin, fluorine resin, polyvinylidene fluoride, phenol resin, celluloid, chitin, starch sheet, acrylic resin, melamine resin, and alkyd resin.

(68) A product according to any one of (62) through (67), which is at least one member selected from the group consisting of building materials, machinery, vehicles, glass products, electric appliances, agricultural materials, electronic apparatus, tools, tableware, bath products, toiletry products, furniture, clothing, cloth products, fibers, leather products, paper products, sporting goods, futon, containers, eyeglasses, signboards, piping, wiring, brackets, sanitary materials, and automobile parts.

(69) A method for imparting photocatalytic property and hydrophilicity to a product as recited in any one of (27), (28), and (68), wherein a light source employed for causing the product to exhibit photocatalytic property and hydrophilicity is at least one species selected from the group consisting of sunlight, a fluorescent lamp, a mercury lamp, a xenon lamp, a halogen lamp, a mercury xenon lamp, a metal halide lamp, a light-emitting diode, a laser, and flame obtained through combustion of an organic substance.

DETAILED DESCRIPTION OF THE INVENTION

The present invention will next be described in detail.

The present invention relates to a photocatalyst exhibiting high activity even when irradiated with light from a light source of low luminous energy. More particularly, the present invention relates to photocatalytic particles and a photocatalytic powder exhibiting sufficient photocatalytic properties when irradiated with light from a practical light source of low luminous energy, such as a day white fluorescent lamp; a material containing the particles or powder, such as an organic polymer composition, a slurry, a coating agent, or a film exhibiting photocatalytic property: and a product containing the particles or powder. The composition and the film are barely colored, and the film has high transparency.

In 5 L of dry air containing 20 ppm acetaldehyde, after the photocatalytic particles of the present invention (3.5 g) which have been uniformly applied onto a plane having a diameter of 9 cm are irradiated with light for one hour by use of a day white fluorescent lamp such that the intensity of UV rays of 365 nm is 6 $\mu W/cm^2$, percent decomposition of the acetaldehyde (hereinafter may be referred to as "DWA") is at least about 20%. DWA is preferably at least about 40%, more preferably at least about 80%.

The percent decomposition can be measured through, for example, the following procedure. The photocatalytic particles (powder containing the particles may be used) (3.5 g) are uniformly applied onto the inner bottom of a glass laboratory dish having an inner diameter of 9 cm, and the laboratory dish is placed in a container (volume: 5 L) which transmits visible light and UV light (e.g., a bag formed of vinyl fluoride film). Subsequently, dry air (5 L) containing acetaldehyde (20 ppm) is charged into and removed from the container (this procedure is performed at least once), and dry air (5 L) containing acetaldehyde (20 ppm) is again charged into the container, to thereby thoroughly substitute gas in the container with the dry air. Thereafter, the container is irradiated with light for one hour, followed by measurement of the percent decomposition of the acetaldehyde other than acetaldehyde adsorbed on titanium dioxide (hereinafter simply referred to as "the percent decomposition"). In this case, the photocatalytic particles applied onto the laboratory dish are irradiated with light by use of a day white fluorescent lamp serving as a light source such that the intensity of UV rays of 365 nm is 6 $\mu W/cm^2$.

The procedure for measurement of the percent decomposition will next be described in more detail.

When the photocatalytic particles assume a powder form, the powder is employed. When the photocatalytic particles assume a slurry form the slurry is dried through heating or dried under vacuum; preferably, the slurry is dried at a temperature higher than the boiling point of the solvent, and the resultant product is pulverized, to thereby prepare powder. When the photocatalytic particles assume an aqueous slurry form, the slurry is preferably dried at a temperature of about 100° C. to about 120° C. The thus-prepared powder (3.5 g) is uniformly applied onto the inner bottom of a glass laboratory dish having an inner diameter of 9 cm and the laboratory dish is placed in a bag formed of vinyl fluoride film (volume: 5 L). Examples of the bag formed of vinyl fluoride film include a Tedler bag (AAK-5, product of GL Sciences Inc.). Dry air containing acetaldehyde (20 ppm) can be prepared from dry air by use of a permeator (PD-1B, product of Gastec Corporation). Examples of the dry air employed include commercially available compressed air (i.e., air which is compressed so as to have a pressure of about 14.7 MPa at 35° C., and contains no moisture and compressor oil). Subsequently, dry air (5 L) containing acetaldehyde (20 ppm) is charged into and removed from the bag formed of vinyl fluoride film (this procedure is performed at least once). This procedure is required because titanium dioxide adsorbs acetaldehyde to some extent. After dry air (5 L) containing acetaldehyde (20 ppm) is again charged into the bag, the initial concentration of acetaldehyde ($C0T$, ppm) in the bag is measured by use of a detector tube (No. 92L, product of Gastec Corporation).

Figure 1:
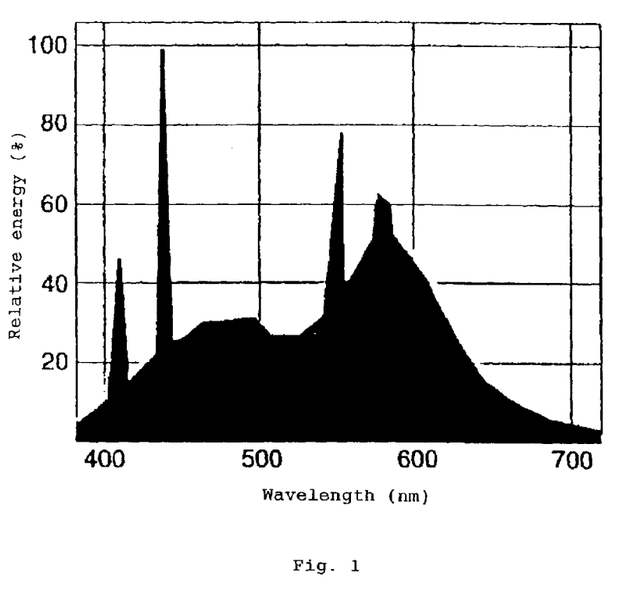
FIG. 1 shows an exemplary light-intensity spectrum of a day white fluorescent lamp.

A day white fluorescent lamp is prepared as a light source. Examples of the day white fluorescent lamp include High White FL20SS-N/18-B (product of Hitachi GE Lighting, Ltd.). FIG. 1 shows an exemplary spectrum of relative energy of light from the fluorescent lamp (according to the catalogue of day white fluorescent lamps by Hitachi GE Lighting. Ltd.).

The light intensity is measured by use of, for example, UVA-365 (product of Atex Corp.). By use of this apparatus, the light intensity at 365 nm can be measured.

Subsequently, the bag is irradiated with light at a predetermined light intensity. One hour after the initiation of this irradiation, the concentration of the acetaldehyde ($C1T$, ppm) in the bag is measured.

Meanwhile, for control, a bag containing acetaldehyde is prepared in a manner similar to that described above, and the bag is allowed to stand in the dark for one hour. In this case, the initial concentration of acetaldehyde in the bag is taken as $C0B$, and the concentration of acetaldehyde in the bag after one hour is taken as $C1B$ (ppm).

The percent decomposition of the acetaldehyde other than acetaldehyde adsorbed on titanium dioxide (i.e., DWA) is obtained by use of the following formula.

$$DWA=\{(C0T-C1T)-(C0B-C1B)\}/C0T \times 100\ (\%)$$

A characteristic feature of the photocatalytic particles of the present invention resides in that DWA is at least about 20%. DWA is preferably at least about 40%, more preferably at least about 80%.

Titanium dioxide contained in the photocatalytic particles preferably has a BET specific surface area of about 10 to about 300 m$^2$/g. The BET specific surface area is more preferably about 30 to about 250 m$^2$/g, much more preferably about 50 to about 200 m$^2$/g. When the BET specific surface area is less than about 10 m$^2$/g, photocatalytic property is impaired whereas when the BET specific surface area is greater than about 300 m$^2$/g, productivity is lowered, resulting in failure of use in practice.

The crystal form of titanium dioxide may be any one selected from among anatase, rutile, and brookite. Anatase or brookite is preferred, with brookite being more preferred.

Titanium dioxide may contain two or more crystal forms selected from among anatase, rutile, and brookite. When titanium dioxide contains two or more crystal forms, the activity of the titanium dioxide may be improved as compared with the case of titanium dioxide containing a single crystal form selected from the above.

The photocatalytic powder may contain composite particles containing titanium dioxide and photocatalytically inactive ceramic. The photocatalytically inactive ceramic may be present in titanium dioxide particles or on the surfaces of the particles. When the ceramic is present on the surfaces of titanium dioxide particles, preferably, the particles are partially coated with the ceramic. When the ceramic is present in titanium dioxide particles, an n-type semiconductor or p-type semiconductor is formed, possibly improving activity under irradiation with visible light. When the ceramic is present on the surfaces of titanium dioxide particles, contact between the particles and an organic substance can be prevented, extending practical applications of the photocatalytic particles.

The case where photocatalytically inactive ceramic is present on the surfaces of titanium dioxide particles will next be described. No particular limitation is imposed on the photocatalytically inactive ceramic, but the ceramic is preferably a salt containing at least one metal selected from the group consisting of an alkaline earth metal, a transition metal, and Al. The alkaline earth metal may be Mg, Ca, Sr, Ba, or Ra. From the viewpoint of performance, Mg or Ca is particularly preferred. No particular limitation is imposed on the transition metal, but Fe or Zn is preferred. The amount of the metal is preferably about 0.01 to about 20 mass %, more preferably about 0.01 to about 10 mass %, on the basis of the mass of titanium dioxide. When the amount of the metal is less than about 0.01 mass %, the metal fails to serve as a binder, and thus a polybasic acid salt is easily liberated in a medium. In contrast when the amount of the metal exceeds about 20 mass %, dispersibility of titanium dioxide fine particles in a medium is deteriorated.

Examples of the polybasic acid salt include a phosphate, a condensed phosphate, a borate, a sulfate, a condensed sulfate, and a polycarboxylate. Of these, a condensed phosphate is preferred. Examples of the condensed phosphoric acid include pyrophosphoric acid, a tripolyphosphate, tetrapolyphosphoric acid, a metaphosphate, and an ultraphosphate. Of these, pyrophosphoric acid or tripolyphosphoric acid is preferred.

In order to coat the surfaces of titanium dioxide with an polybasic acid salt, for example, a predetermined polybasic acid or a water-soluble metallic salt thereof is added to an aqueous slurry containing titanium dioxide and dispersed completely, and then an aqueous solution of a chloride of a metal to be supported on the titanium dioxide is added to the resultant slurry, followed by aging.

Examples of the photocatalytically inactive ceramic include, in addition to polybasic acid salts, an Si compound, an Al compound, a P compound, a B compound, an S compound, and an N compound. Specific examples include silica, zirconia, alumina, magnesia, calcia, amorphous titania, mullite, spinel, phosphoric acid, condensed phosphoric acid, boric acid, sulfuric acid, condensed sulfuric acid, and nitric acid.

The amount of the photocatalytically inactive ceramic is preferably about 0.01 to about 50 mass %, more preferably about 0.1 to about 20 mass %, on the basis of the mass of titanium dioxide. When the amount of the photocatalytically inactive ceramic is less than about 0.01 mass %, the photocatalytic effect of the titanium dioxide on a medium such as plastic, paper, or fiber deteriorates the durability of the medium. In contrast, when the amount of the photocatalytically inactive ceramic exceeds about 50 mass %, economical disadvantages arise.

Surprisingly, when titanium dioxide fine particles a polybasic acid ion, and an alkaline earth metal or a transition metal or Al are present in combination, a metallic salt of a polybasic acid (hereinafter referred to as a "polybasic acid salt") is firmly coupled with or supported on the titanium dioxide fine particles, and a polybasic acid salt, which is soluble, is not easily liberated from the surfaces of the titanium dioxide fine particles in a medium such as a binder or a resin. The mechanism for this has not yet been elucidated, but metallic ions are thought to serve as a binder between polybasic acid ions and titanium dioxide fine particles.

More surprisingly, it has been found that when titanium dioxide is subjected to the aforementioned surface treatment, the photocatalytic activity of the titanium dioxide may be improved as compared with the case where titanium dioxide is not subjected to such treatment. The improvement of photocatalytic activity has been confirmed particularly when titanium dioxide is partially subjected to surface treatment by use of a polybasic acid. The reason for improvement of photocatalytic activity has not yet been elucidated, but is considered to be as follows. A plurality of electron-inductive carboxylic groups or sulfonyl groups interact with Ti atoms on the surfaces of titanium dioxide particles, and electrons generated in the particles through light absorption are separated from holes on the surfaces of the particles, resulting in improvement of photocatalytic activity of the particles. Also, the reason for improvement of photocatalytic activity is considered to be as follows. A new energy level is formed by a Ti-containing composite oxide formed on the surface of titanium dioxide, and the composite oxide may contribute to generation of a band gap which corresponds to visible light. Conventionally, it has been considered that when titanium dioxide is subjected to surface treatment with a photocatalytically inactive substance, the photocatalytic activity of the titanium dioxide is suppressed. However, in the present invention, it has been found that when a specific substance is employed with titanium dioxide in combination, the photocatalytic activity of the titanium dioxide can be improved. Meanwhile, terminal atomic groups of a substance employed for surface treatment are photocatalytically inactive, and the atomic groups sterically prevent contact between an organic material and titanium dioxide particles. Therefore, when the particles are applied to an organic material, the durability of the organic material is advantageously improved. Occurrence of the aforementioned phenomena is apprehensible in view of the following: a substance to be decomposed generally assumes a gas or liquid form, and thus the substance continually moves over the photocatalytic particles (i.e., the substance is movable); in contrast, an organic substrate assumes a solid form, and the photocatalytic particles are fixed on the substrate.

Composite particles containing titanium dioxide and photocatalytically inactive ceramic preferably have a BET specific surface area of about 10 to about 300 m$^2$/g. The BET specific surface area is more preferably about 30 to about 250 m$^2$/g, much more preferably about 50 to about 200 m$^2$/g. When the BET specific surface area is less than about 10 m$^2$/g, photocatalytic property is impaired, whereas when the surface area exceeds 300 m$^2$/g, productivity is lowered, resulting in failure of use in practice.

The photocatalytic particles of the present invention preferably have an isoelectric point of about 4 or less obtained on the basis of a zeta potential as measured by means of an electrophoresis light-scattering method. The isoelectric point is more preferably about 3 or less, much more preferably about 2 or less. The method for measuring a zeta potential will next be described.

Various methods for measuring a zeta potential are available. The present invention employs an electrophoresis light-scattering method in which an electrophoretic rate is analyzed on the basis of frequency shift as measured by means of a laser Doppler method. Specifically, a zeta potential can be measured by use of ELS-8000 (product of Otsuka Electronics Co., Ltd.).

A sample (about 0.01 g; i.e., an amount as obtained by a micro spatula) is added to a 0.01 mol/l NaCl solution (about 50 ml). If necessary, the pH of the solution Is adjusted by use of HCl or NaOH (0.01 or 0.1 mol/1). Subsequently, the solution is subjected to ultrasonic dispersion for about one minute, followed by measurement of zeta potential.

The photocatalytic powder of the present invention may be added to an organic polymer to thereby prepare a composition. Examples of the organic polymer which may be employed include thermoplastic resin, thermosetting resin, and natural resin. By virtue of the presence of the aforementioned photocatalytically inactive ceramic, since the organic polymer is not in direct contact with the photocatalytic active surface of titanium dioxide, the organic polymer serving as a medium is barely decomposed and impaired, thereby enhancing durability of the polymer.

Specific examples of the organic polymer include polyolefins such as polyethylene, polypropylene, and polystyrene: polyamides such as nylon 6, nylon 66 and aramid; polyesters such as polyethylene terephthalate and unsaturated polyesters; polyvinyl chloride; polyvinylidene chloride; polyethylene oxide; polyethylene glycol; silicon resin; polyvinyl alcohol; vinylacetal resin; polyacetate; ABS resin; epoxy resin; vinyl acetate resin; cellulose derivatives such as cellulose and rayon; urethane resin; polyurethane resin; polycarbonate resin; urea resin; fluorine resin; polyvinylidene fluoride; phenol resin; celluloid; chitin; starch sheet; acrylic resin; melamine resin; and alkyd resin.

The organic polymer composition containing the photocatalytic powder of the present invention can be used in the form of, for example, a compound or a masterbatch. The amount of the photocatalytic powder in the organic polymer composition is about 0.01 to about 80 mass %, preferably about 1 to about 50 mass %, on the basis of the entirety of the composition. The organic polymer composition may contain an absorbent such as activated carbon or zeolite, in order to enhance the effect of removing malodorous substances. In the present invention, the polymer composition is subjected to molding, to thereby obtain a polymer formed article having photocatalytic properties. Examples of the formed article obtained from the composition include fiber, film, and plastic formed articles. Specifically, the polymer composition can be applied to, for example, building materials, machinery, vehicles, glass products, electric appliances, agricultural materials, electronic apparatus, tools, tableware, bath products, toiletry products, furniture, clothing, cloth products, fibers, leather products, paper products, sporting goods, futon, containers, eyeglasses. signboards, piping, wiring, brackets, sanitary materials, and automobile parts.

As used herein, the term "slurry" refers to a solvent dispersion containing the aforementioned photocatalytic particles. Examples of the photocatalytic particles include a powder obtained from TiCl$_4$ by means of a vapor phase method, particles obtained from a TiCl$_4$ aqueous solution or a titanyl sulfate aqueous solution by means of a liquid phase method, and particles obtained through surface treatment of the above particles by use of a polybasic acid salt. No particular limitation is imposed on the solvent, but preferably, a hydrophilic solvent is employed, since the surface of the photocatalytic particles generally exhibits hydrophilicity. More preferably, water is employed. Alternatively, a hydrophilic organic solvent may be added to water.

No particular limitation is imposed on the amount of the photocatalytic particles in the aforementioned slurry, but the amount is preferably about 0.01 to about 50 mass %, more preferably about 1 to about 40 mass%. When the amount of the photocatalytic powder is less than about 0.01 mass %, sufficient photo-functional property cannot be obtained after coating of the slurry. In contrast, when the amount exceeds about 50 mass %, problems such as thickening of the slurry arise, along with economical disadvantages.

When a solvent containing water is employed, the pH of the slurry is preferably about 4 to about 10. More preferably, the pH of the slurry is about 6 to about 8. When the pH of the slurry is less than about 4 or exceeds about 10, the slurry adversely affects living organisms and the environment, and the corrosion effect of the slurry on metal becomes non-negligible. As a result, the slurry is difficult to apply to a metallic substrate.

A characteristic feature of the slurry of the present invention resides in its high transmittance. The method for measuring transmittance will next be described. A spectrophotometer is employed for measurement of transmittance. Measurement by use of a spectrophotometer CM-3700d (product of Minolta Co., Ltd.) will next be described.

A slurry (photocatalytic powder content: 10%) is prepared in a glass cell having an optical length of 2 mm. The sample in the glass cell is irradiated with light from a xenon lamp serving as a light source, the light being diffused and reflected by an integrating sphere. The light which transmits through the cell is received by a spectrophotometer. Meanwhile, light which is diffused in the integrating sphere is received by a spectroscope for illumination light. Subsequently, the spectrum of the respective received light is obtained, and transmittance at a predetermined wavelength is measured.

A characteristics feature of the slurry resides in that, when the slurry contains the photocatalytic particles in an amount of 10%, the transmittance of the slurry as measured at 550 nm and a thickness (optical length) of 2 mm is at least about 10%. More preferably, the transmittance of the slurry is at least about 30%. When the slurry is applied to an object, the design or color of the object are not impaired. Therefore the slurry provides great advantages in practical applications.

A binder may be arbitrarily added to the dispersion (slurry) to thereby prepare a coating agent. The resultant coating agent may be applied to the surfaces of the various structures described below, to thereby produce photocatalytic structures. The slurry may be used in the form of, for example, a coating material or a coating composition. No particular limitation is imposed on the binder material employed in the present invention, and the binder material may be an organic or inorganic binder. Examples of the organic binder include water-soluble binders. Specific examples include polyvinyl alcohol, melamine resin, urethane resin, celluloid, chitin, starch sheet, polyacrylamide, acrylamide. Examples of the inorganic binder include Zr compounds, Si compounds, Ti compounds, and Al compounds. Specific examples include zirconium compounds such as zirconium oxychloride, zirconium hydroxychloride, zirconium nitrate, zirconium sulfate, zirconium acetate, ammonium zirconium carbonate, and zirconium propionate; silicon compounds such as alkoxysilane products obtained through partial hydrolysis of alkoxysilane with a mineral acid, and silicates; and alkoxides of metals such as aluminum and Ti.

Particularly when a binder having a plurality of functional groups such as a carboxyl group and a sulfonyl group is employed, the coating agent exhibits excellent photocatalytic property even when irradiated with light from a practical light source of low luminous energy, such as a fluorescent lamp. Specific examples of such a binder include water-soluble urethane emulsion. The reason for improvement of photocatalytic property has not yet been elucidated, but is considered to be as follows. Like the aforementioned case where titanium dioxide is subjected to surface treatment with a polybasic acid, a plurality of electron-inductive carboxylic groups or sulfonyl groups—which are present in water-soluble urethane emulsion—interact with Ti atoms on the surfaces of titanium dioxide particles, and thus electrons generated in the particles through light absorption are separated from holes on the surfaces of the particles, or a band gap on the surfaces of the titanium dioxide particles varies, resulting in improvement of photocatalytic activity of the particles.

Specifically, the amount of the binder contained in the coating agent is preferably about 0.01 to about 20 mass %, more preferably about 1 to about 10 mass %. When the amount of the binder is about 0.01 mass % or less, adhesion of the coating agent becomes insufficient after coating, whereas when the amount of the binder exceeds about 20 mass %, problems such as thickening of the agent arise, along with economical disadvantages.

When an organic binder is employed or a product obtained through partial hydrolysis of alkoxysilane with a mineral acid is employed as a binder, application and hardening of the coating agent can be performed at about 30° C. or lower. Alternatively, application of the coating agent may be performed at about 30° C. or lower, and then hardening of the agent may be performed at about 200° C. or lower. In addition, the coating agent may be applied to an inorganic binder serving as an inorganic substrate at about 30° C. or lower, and then the agent is hardened at about 500° C. or lower, to thereby form a film of high hardness. When the crystallinity of titanium dioxide in the film is improved, the photocatalytic property of the film may be improved. For improvement of photocatalytic property, the film is preferably heated at about 300 to about 500° C.

The product containing a film exhibiting photocatalytic property of the present invention has photocatalytic properties described below.

In dry air (5 L) containing 60 ppm hydrogen sulfide, after the film exhibiting photocatalytic property (surface area: 400 cm$^2$) is irradiated with light for four hours by use of a day white fluorescent lamp such that the intensity of UV rays of 365 nm is 6 $\mu$W/cm$^2$, percent decomposition of the hydrogen sulfide (hereinafter may be referred to as "DWH") is at least about 20%.

The percent decomposition can be measured through, for example, the following procedure. A product containing a photocatalytic film is placed in a bag (volume: 5 L) formed of vinyl fluoride film such that the area of the film to be irradiated with light becomes 400 cm$^2$. Subsequently, dry air (5 L) containing hydrogen sulfide (60 ppm) is charged into and removed from the bag (this procedure is performed at least once), and dry air (5 L) containing hydrogen sulfide (60 ppm) is again charged into the bag, to thereby sufficiently substitute gas in the bag with the dry air. Thereafter, the bag is irradiated with light for four hours, followed by measurement of the percent decomposition of the hydrogen sulfide other than hydrogen sulfide adsorbed on titanium dioxide. In this case, the product containing the photocatalytic film is irradiated with light by use of a day white fluorescent lamp serving as a light source such that the intensity of UV rays of 365 nm is 6 $\mu W/cm^2$.

In the present invention, since the slurry of high transmittance is employed as a raw material for a coating agent, a film produced from the coating agent has high transparency. Photocatalytic particles for providing a film of high transparency are preferably formed from titanium dioxide synthesized through a liquid phase method. Specific examples of the photocatalytic particles include particles obtained from a $TiCl_4$ aqueous solution or a titanyl sulfate aqueous solution through thermal hydrolysis or neutralization/hydrolysis, and particles obtained through surface treatment of the above particles by use of a polybasic acid salt and an alkaline earth metal. The resultant film exhibiting effective photocatalytic property preferably has a thickness of about 0.01 to about 100 $\mu m$. In order to effectively prevent interference fringes, the thickness of the film is preferably about 0.01 to about 0.1 $\mu m$, or about 1 $\mu m$ or more.

When a substrate is transparent, the transparency of a photocatalytic film formed on the substrate is evaluated as follows. When transmittance at 550 nm in the absence of a film exhibiting photocatalytic property (i.e., before film formation) is represented by "T1%," and transmittance at 550 nm in the presence of the film (i.e., after film formation) is represented by "T2%," the ratio of T2/T1 is preferably at least about 0.9. More preferably, T2/T1 is at least 0.95. When T2/T1 is less than about 0.9, non-transparency of the substrate is noticeable in practice.

When a substrate is not transparent, the transparency of a photocatalytic film formed on the substrate is evaluated as follows by use of the light reflectivity of the film.

A spectrophotometer is employed for measurement of light reflectivity. Measurement by use of a spectrophotometer CM-3700d (product of Minolta Co., Ltd.) will next be described. A film sample is irradiated with light from a xenon lamp serving as a light source, the light being diffused and reflected by an integrating sphere. Of all the light reflected from the film sample, the light reflected in the direction at an angle of 8° with respect to an axis perpendicular to the sample is received by a spectrophotometer. Meanwhile light which is diffused in the integrating sphere is received by a spectroscope for illumination light. Subsequently, the spectrum of the respective received light is obtained, and light reflectivity at a predetermined wavelength is measured.

When light reflectivity at 550 nm before formation of a film exhibiting photocatalytic property is represented by "R1%," and light reflectivity at 550 nm after formation of the film is represented by "R2%," the ratio of R2/R1 is preferably at least about 0.9. More preferably, R2/R1 is at least about 0.95. When R2/R1 is less than about 0.9, the effect of hiding the substrate and non-transparency of the film are practically noticeable.

A characteristic feature of the film exhibiting photocatalytic property of the present invention resides in that the film has a pencil hardness of at least 2H. A film having a high pencil hardness is not easily damaged. Particularly when a Zr compound is employed as a binder, a hard film is easily obtained.

No particular limitation is imposed on the substrate (product), and an inorganic or organic substrate may be employed. Examples of the inorganic substrate include Si compounds, Al compounds, various types of ceramic, and metals. Specific examples include silica, alumina, mullite, spinel, zirconia, titania, graphite, carbon nano-tube, diamond, iron, stainless steel, titanium, zircon, niobium, and tantalum.

Examples of the organic substrate include organic polymers. Specific examples include polyethylene, polypropylene, polystyrene, nylon 6, nylon 66, aramid, polyethylene terephthalate, unsaturated polyesters, polyvinyl chloride, polyvinylidene chloride, polyethylene oxide, polyethylene glycol, silicon resin, polyvinyl alcohol, vinylacetal resin, polyacetate, ABS resin, epoxy resin, vinyl acetate resin, cellulose derivatives such as cellulose and rayon, urethane resin, polyurethane resin, polycarbonate resin, urea resin, fluorine resin, polyvinylidene fluoride, phenol resin, celluloid, chitin, starch sheet, acrylic resin, melamine resin, and alkyd resin.

A product formed from a masterbatch or a compound which is obtained from the aforementioned organic polymer composition exhibits hydrophilicity, as does a product having, on its surface, a film exhibiting photocatalytic property which is formed from the aforementioned coating agent. Photocatalytic particles which cause the product to exhibit high hydrophilicity are preferably formed from titanium dioxide synthesized by means of a liquid phase method. Preferred examples of the particles include particles obtained from a $TiCl^4$ aqueous solution or a titanyl sulfate aqueous solution through thermal hydrolysis or neutralization/hydrolysis, and particles obtained through surface treatment of the above particles by use of a polybasic acid salt and an alkaline earth metal. Hydrophilicity can be represented by use of, as an index, a contact angle with respect to water. A method for measuring the contact angle will next be described.

A droplet of pure water is added to the surface of a film, and the contact angle between the surface of the film and the droplet is measured. Measurement by use of a contact angle meter (CA-D, product of Kyowa Interface Science Co., Ltd.) will next be described. Firstly, a droplet of pure water ($\phi$ 1.5) is added carefully from a syringe of the measurement apparatus to the surface of a film (the amount of the droplet corresponds to 20 increment scales of the apparatus). Subsequently, the top of the droplet is schematically obtained by use of an angle plate and a movable reticle, and the angle between the top and an end point of the droplet is doubled, to thereby obtain the contact angle between the droplet and the surface of the film.

A characteristic feature of the film exhibiting photocatalytic property of the present invention resides in that, after the film is irradiated with light for 24 hours by use of a day white fluorescent lamp such that the intensity of UV rays of 365 nm is 6 $\mu W/cm^2$, the contact angle of the film with respect to water (hereinafter referred to as "CL") is about 20° or less. CL is preferably about 10° or less, more preferably about 5° or less.

The film exhibiting photocatalytic property of the present invention maintains excellent hydrophilicity even when allowed to stand in the dark after being irradiated with light. Specifically, after the film exhibiting photocatalytic property is irradiated with light for 24 hours by use of a day white fluorescent lamp such that the intensity of UV rays of 365 nm is 6 $\mu W/cm^2$, and then allowed to stand in the dark for 24 hours, the contact angle of the film with respect to water (hereinafter may be referred to as "CD") is about 20° or less. CD is preferably about 10° or less, more preferably about 50 or less.

Thus, since the film has hydrophilicity, for example, stains adhering to the surface of the film are easily removed. Therefore, the film can maintain a clean surface for a long period of time. Alternatively, even when the surface of the film is stained, the stained surface can be easily cleaned.

The film exhibiting photocatalytic property of the present invention exhibits excellent weather resistance. Specifically after the film exhibiting photocatalytic property is subjected for 4,000 hours to an acceleration-exposure test employing a xenon arc lamp (apparatus: Sunshine Xenon Long Life Weather Meter (product of Suga Test Instruments Co., Ltd.), BP temperature: 63±3° C., raining: 12/60 minutes), and the film is irradiated with light for 24 hours by use of a day white fluorescent lamp such that the intensity of UV rays of 365 nm is 6 $\mu$W/cm$^2$, the contact angle of the film with respect to water is about 20° or less, and the film has a yellowing degree of about 10 or less.

No particular limitation is imposed on the product to which photocatalytic property and hydrophilicity are imparted as described above. Examples of the product include building materials, machinery, vehicles, glass products, electric appliances, agricultural materials, electronic apparatus, tools, tableware, bath products, toiletry products, furniture, clothing, cloth products, fibers, leather products, paper products, sporting goods, futon, containers, eyeglasses, signboards, piping, wiring, brackets, sanitary materials, and automobile parts.

Examples of the light source for causing the aforementioned product to effectively exhibit photocatalytic property and hydrophilicity include sunlight, a fluorescent lamp, a mercury lamp, a xenon lamp, a halogen lamp, a mercury xenon lamp, a metal halide lamp, a light-emitting diode, a laser, and flame obtained through combustion of an organic substance. Examples of the fluorescent lamp include a white fluorescent lamp, a day white fluorescent lamp, a daylight fluorescent lamp, a warm white fluorescent lamp, an incandescent color fluorescent lamp, and Black light.

BEST MODE FOR CARRYING OUT THE INVENTION

The present invention will next be described in detail by way of Examples, which should not be construed as limiting the invention thereto.

EXAMPLE 1
(Synthesis of Titanium Dioxide by Means of a Liquid Phase Method and Surface Treatment by use of a Polybasic Acid)

Pure water (50 liters) (hereinafter the term "liter(s)" will be referred to as simply "L")—which had been weighed in advance—was heated to 98° C. with stirring and maintained at this temperature. A titanium tetrachloride aqueous solution (Ti concentration: 15 mass %) (product of Sumitomo Sitix of Amagasaki, Inc.) (3.6 kg) was added dropwise to the heated water over 120 minutes. The thus-obtained white suspension was subjected to dialysis by use of an electric dialyzer, to thereby remove chlorine and adjust the pH of the slurry to 5. A portion of the thus-obtained photocatalytic slurry was collected, and the solid content was measured by means of a dry constant weight method and found to be 2 mass %. The resultant dried powder was subjected to structure analysis by use of an X-ray diffraction apparatus. As a result, the powder was found to be of brookite-type titanium dioxide. The brookite content and the anatase content of the titanium dioxide were 89% and 11%, respectively.

Subsequently, sodium metaphosphate (for food addition, product of Taihei Chemical Industrial Co., Ltd.) (1 kg) was added to the resultant titanium dioxide slurry (50 L) (solid content: 2 mass %), which was stirred sufficiently until the metaphosphate was dispersed in the slurry. Thereafter, calcium chloride (for food addition, product of Tokuyama Corporation) (200 g) was added to pure water (2,000 L) which had been weighed in advance, to thereby prepare a calcium chloride solution.

The above-obtained sodium-metaphosphate-containing titanium dioxide slurry and the calcium chloride solution were mixed together. A 10% sodium hydroxide aqueous solution was added to the resultant mixture to thereby adjust the pH of the mixture to 9, and the resultant mixture was maintained at 40° C. for one hour. The electric conductivity of the mixture was 10,000 $\mu$S/cm. Subsequently, the thus-obtained slurry was washed through filtration by use of a rotary filter press (product of Kotobuki Engineering & Manufacturing Co., Ltd.) and then washed thoroughly with water until the electric conductivity of the filtrate became 50 $\mu$S/cm, followed by concentration under vacuum at 40° C., to thereby obtain a photocatalytic slurry.

The pH of the resultant photocatalytic slurry was measured by use of a pH meter (model: D-22, product of Horiba Ltd.) and found to be 7.8. The zeta potential of the slurry was measured by means of an electrophoresis light-scattering method by use of ELS-8000 (product of Otsuka Electronics Co., Ltd.). The isoelectric point was obtained on the basis of the thus-measured zeta potential and found to be 2.1.

A portion of the thus-obtained slurry was collected and subjected to a dry constant weight method at 120° C., to thereby obtain a powder. The solid content of the slurry was measured and found to be 10 mass %. The transmittance of the slurry as measured at a thickness (optical length) of 2 mm and a wavelength of 550 nm was 46%; i.e., the slurry exhibited excellent dispersibility. Subsequently, the thus-obtained powder was subjected to FT-IR analysis by use of FT-IR1650 (product of PerkinElmer), and as a result, the absorption of metaphosphoric acid was observed. Thereafter, the dried powder was subjected to ICP analysis by use of ICPS-100V (product of Shimadzu Corporation), and Ca (0.5%) and phosphorus (1.2%) were found to be present. The primary particle size of the powder was determined to be 0.015 $\mu$m on the basis of the results of BET specific surface area as measured by use of Flow Sorb II 2300 (product of Shimadzu Corporation). The DWA of the powder was 83%.

(Preparation of High-Density Polyethylene Masterbatch)

A portion of a photocatalytic slurry obtained in a manner similar to that described above was dried by use of a medium fluidized drier (Slurry Drier, product of Okawara Mfg. Co., Ltd.), to thereby prepare a photocatalytic powder (5 kg) containing a calcium-containing condensed phosphate on the surfaces of titanium dioxide fine particles. The photocatalytic powder (20 parts by mass), zinc stearate (Zinc Stearate S, product of NOF Corporation) (2 parts by mass), and high-density polyethylene (Jrex F6200FD, product of Japan Polyolefins Co., Ltd.) (78 parts by mass) were melt-kneaded at 170° C. (residence time: about three minutes) by use of a twin-screw extruder (model: PCM30, product of Ikegai Iron Works, Ltd.) and the resultant product was pelletized, to thereby obtain a high-density polyethylene columnar compound (20 kg) containing a photocatalytic powder in an amount of 20% and having a diameter of 2 to 3 mm$\phi$, a length of 3 to 5 mm, and a weight of 0.01 to 0.02 g.

(Spinning)

The above-obtained photocatalytic-powder-containing high-density polyethylene compound (10 kg) and high-density polyethylene (Jrex F6200FD, product of Japan Polyolefins Co., Ltd.) (10 kg) were mixed together for 10 minutes by use of a V-type blender (RKI-40, product of Ikemoto Scientific Technology Co., Ltd.), to thereby prepare composite pellets. Subsequently, the resultant composite pellets and polyester resin pellets (FM-OK, product of Teijin Ltd.) were fed into a melt extrusion spinning machine (Polymer-Maid 5, product of Chuo Kagaku Kikai Seisakusho), and then spun at a packing temperature of 300° C., to thereby produce 12-denier fiber (35 kg) having a core-sheath structure of photocatalytic-powder-containing high-density polyethylene (sheath)/polyester resin (core), in which the ratio by mass of the photo-functional-powder-containing high-density polyethylene and the polyester resin was 1:1.

(Evaluation of Photocatalytic Activity)

The above-obtained fiber (10 g) was placed in a 5-liter Tedler bag (product of Gastec Corporation), hydrogen sulfide (60 ppm) was fed into the bag, and the bag was sealed. Subsequently, the bag was irradiated with light for six hours by use of a day white fluorescent lamp (High White FL20SS-N/18-B, product of Hitachi GE Lighting, Ltd.) such that the intensity of UV rays of 365 nm was 6 $\mu W/cm^2$. Thereafter, the concentration of the hydrogen sulfide was measured by use of a detector tube (No. 4LL, product of Gastec Corporation). After the six-hour irradiation, little hydrogen sulfide was detected.

(Weather Resistance Test)

The above-obtained fiber was irradiated with light of 50 $mW/cm^2$ for 24 hours by use of a light fastness tester (SUNSET CPS+, product of ATLAS). After the 24-hour irradiation, no coloring of the fiber was observed.

(Coating Agent Preparation 1)

Subsequently, pure water was added to the aforementioned photocatalytic slurry to thereby dilute the slurry such that the concentration as reduced to powder became 0.5%. A water-dispersion-type urethane resin (VONDIC1040NS, product of Dainippon Ink and Chemicals, Inc.) was added to the diluted slurry such that the amount of the resin became 70% on the basis of the entirety of the powder, to thereby prepare a coating agent containing the photocatalytic powder and the urethane resin.

Subsequently, a polyester nonwoven fabric (6 deniers, product of Takayasu Co., Ltd.) was impregnated with the above-prepared coating agent, and the resultant fabric was squeezed by use of a roller, followed by drying at 80° C. for two hours, to thereby obtain a polyester nonwoven fabric on which the photocatalytic powder was supported.

(Evaluation of Photocatalytic Activity)

Subsequently, the polyester nonwoven fabric (10 g) was placed in a 5-liter Tedler bag (product of Gastec Corporation), hydrogen sulfide (60 ppm) was fed into the bag, and the bag was sealed. Thereafter, the bag was irradiated with light for six hours by use of a day white fluorescent lamp such that the intensity of UV rays of 365 nm was 6 $\mu W/cm^2$. Thereafter, the concentration of the hydrogen sulfide was measured by use of a detector tube (No. 4LL, product of Gastec Corporation). After the six-hour irradiation, little hydrogen sulfide was detected.

(Weather Resistance Test)

The above-obtained polyester nonwoven fabric was irradiated with light of 50 $mW/cm^2$ for 24 hours by use of a light fastness tester (SUNSET CPS+, product of ATLAS). After the 24-hour irradiation, no coloring of the fabric was observed.

(Coating Agent Preparation 2)

To the aforementioned photocatalytic slurry were added an ammonium zirconium carbonate solution (20 mass % as reduced to $ZrO_2$, product of Nippon Light Metal Co., Ltd.) and pure water, to thereby prepare a coating agent. The photocatalytic powder content was 1.5 mass %, and the ratio by mass of $ZrO_2$/photocatalytic powder was 20%.

Subsequently, a transparent noise-barrier wall formed of an acrylic resin plate (thickness: 15 mm) was subjected to hard coating treatment by use of Tosguard 510 (product of GE Toshiba Silicones Co., Ltd.), to thereby prepare a transparent hard-coated resin plate. The all-light transmittance of the resin plate was measured by use of a haze meter (model: TC-III, product of Tokyo Densyoku) and found to be 86%. The aforementioned coating agent was applied onto the transparent resin plate through bar coating, to thereby obtain a transparent noise-barrier wall having, on its surface, a photocatalytic film. The DWH of the plate was 37%: the thickness of the photocatalytic film was 0.3 $\mu m$; the all-light transmittance of the transparent resin plate was 86%; the T2/T1 of the film was 0.97; and the pencil hardness of the film was 4H. The contact angle of the film with respect to water was measured, and CL and CD were found to be 2° and 5°, respectively. Furthermore, the transparent resin plate was subjected to an acceleration-exposure test for 4,000 hours by use of Sunshine Xenon Long Life Weather Meter (product of Suga Test Instruments Co., Ltd.) under the following conditions: BP temperature: 63±3° C., raining: 12/60 minutes. After the test, the plate was irradiated with light for 24 hours by use of a day white fluorescent lamp such that the intensity of UV rays of 365 nm is 6 $\mu W/cm^2$. After the 24-hour irradiation, the contact angle of the film with respect to water was 8°, and the degree of yellowing of the film was 6.

EXAMPLE 2

The procedure of Example 1 was repeated, except that the calcium chloride (200 g) employed in Example 1 was changed to magnesium chloride (300 g) (for food addition, product of Naikai Salt Industries Co., Ltd.), to thereby obtain a photocatalytic slurry.

The pH of the resultant photocatalytic slurry was measured and found to be 7.7. The zeta potential of the slurry was measured by means of an electrophoresis light-scattering method by use of ELS-8000 (product of Otsuka Electronics Co., Ltd.). The isoelectric point was obtained on the basis of the thus-measured zeta potential, and was found to be 2.0.

Subsequently, a portion of the thus-obtained slurry was collected, and the solid content was measured by means of a dry constant weight method at 120° C. and found to be 11 mass %. The transmittance of the slurry as measured at a thickness (optical length) of 2 mm and a wavelength of 550 nm was 48%; i.e., the slurry exhibited excellent dispersibility. Subsequently, the resultant powder was subjected to FT-IR analysis, and as a result, the absorption of metaphosphoric acid was observed. Thereafter the dried powder was subjected to ICP analysis, and Mg (0.4%) and phosphorus (1.1%) were found to be present. The primary particle size of the powder was determined to be 0.015 $\mu m$ on the basis of the results of measurement of BET specific surface area. The DWA of the powder was 61%.

EXAMPLE 3

The procedure of Example 1 was repeated, except that the calcium chloride (200 g) employed in Example 1 was changed to ferric chloride hexahydrate (600 g) (guaranteed reagent, product of Kanto Kagaku), to thereby obtain a photocatalytic slurry. The pH of the resultant photocatalytic slurry was measured and found to be 7.7. The zeta potential of the slurry was measured by means of an electrophoresis light-scattering method by use of ELS-8000 (product of Otsuka Electronics Co., Ltd.). The isoelectric point was obtained on the basis of the thus-measured zeta potential, and was found to be 1.9.

Subsequently, a portion of the thus-obtained slurry was collected, and the solid content was measured by means of a dry constant weight method at 120° C. and found to be 11 mass %. The transmittance of the slurry as measured at a thickness (optical length) of 2 mm and a wavelength of 550 nm was 36%; i.e., the slurry exhibited excellent dispersibility. Subsequently, the resultant powder was subjected to FT-IR analysis, and as a result, the absorption of metaphosphoric acid was observed. Thereafter, the dried powder was subjected to ICP analysis, and Fe (0.4%) and phosphorus (0.9%) were found to be present. The primary particle size of the powder was determined to be 0.015 $\mu$m on the basis of the results of measurement of BET specific surface area. The DWA of the powder was 55%.

EXAMPLE 4

The procedure of Example 1 was repeated, except that the sodium metaphosphate (1 kg) employed in Example 1 was changed to sodium tripolyphosphate (2 kg) (for food addition, product of Taihei Chemical Industrial Co., Ltd.), to thereby obtain a photocatalytic slurry. The pH of the resultant photocatalytic slurry was measured and found to be 7.8. The zeta potential of the slurry was measured by means of an electrophoresis light-scattering method by use of ELS-8000 (product of Otsuka Electronics Co., Ltd.). The isoelectric point was obtained on the basis of the thus-measured zeta potential, and was found to be 1.8.

Subsequently, a portion of the thus-obtained slurry was collected, and the solid content was measured by means of a dry constant weight method at 120° C. and found to be 10 mass %. The transmittance of the slurry as measured at a thickness (optical length) of 2 mm and a wavelength of 550 nm was 42%; i.e., the slurry exhibited excellent dispersibility. Subsequently, the resultant powder was subjected to FT-IR analysis, and as a result, the absorption of metaphosphoric acid was observed. Thereafter, the dried powder was subjected to ICP analysis and Ca (0.5%) and phosphorus (1.3%) were found to be present. The primary particle size of the powder was determined to be 0.015 $\mu$m on the basis of the results of measurement of BET specific surface area. The DWA of the powder was 55%.

EXAMPLE 5

The procedure of Example 1 was repeated, except that the calcium chloride (200 g) employed in Example 1 was changed to aluminum chloride hexahydrate (500 g) (guaranteed reagent, product of Kanto Kagaku), and that the sodium metaphosphate was changed to sodium pyrosulfate (guaranteed reagent, product of Kanto Kagaku), to thereby obtain a photocatalytic slurry. The pH of the resultant photocatalytic slurry was measured and found to be 6.9. The zeta potential of the slurry was measured by means of an electrophoresis light-scattering method by use of ELS-8000 (product of Otsuka Electronics Co., Ltd.). The isoelectric point was obtained on the basis of the thus-measured zeta potential, and was found to be 2.0.

Subsequently, a portion of the thus-obtained slurry was collected, and the solid content was measured by means of a dry constant weight method at 120° C. and found to be 10 mass %. The transmittance of the slurry as measured at a thickness (optical length) of 2 mm and a wavelength of 550 nm was 36%; i.e., the slurry exhibited excellent dispersibility. Subsequently, the resultant powder was subjected to FT-IR analysis, and as a result, the absorption of metaphosphoric acid was observed. Thereafter, the dried powder was subjected to ICP analysis, and Al (0.3%) and S (0.6%) were found to be present. The primary particle size of the powder was determined to be 0.015 $\mu$m on the basis of the results of measurement of BET specific surface area. The DWA of the powder was 49%.

EXAMPLE 6

Figure 2:
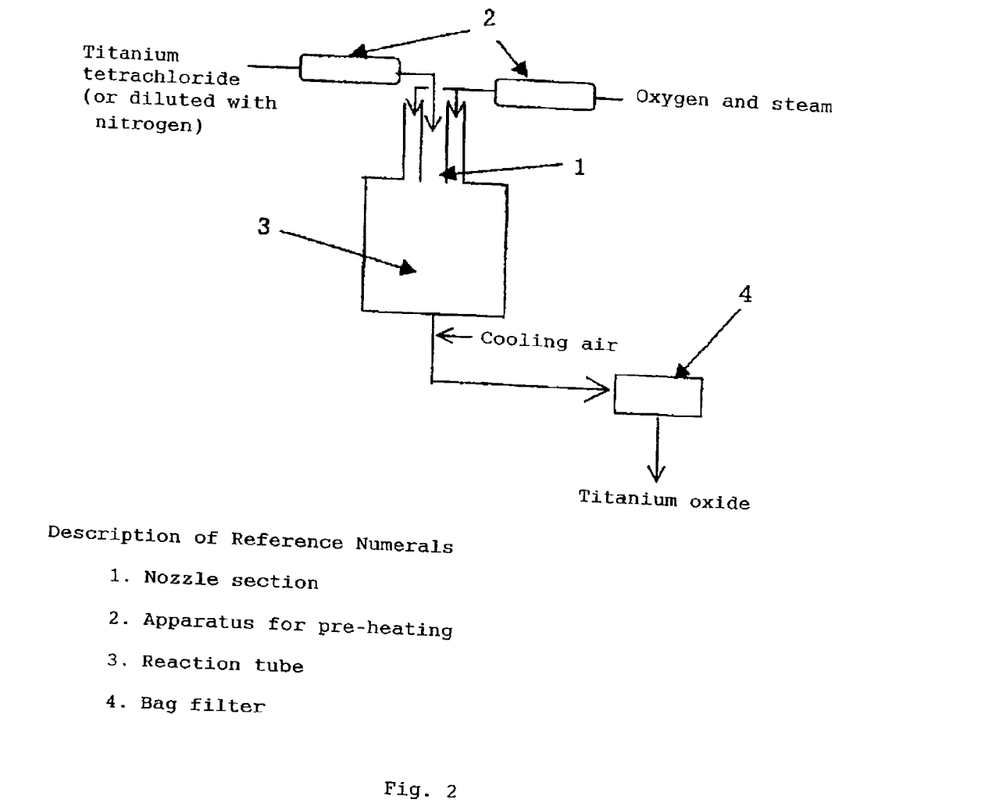
FIG. 2 is a schematic representation showing the reaction apparatus employed in Example 6.

Diluted titanium tetrachloride gas, which had been prepared by diluting gaseous titanium tetrachloride (8.3 Nm$^3$/hr) with nitrogen gas (6 Nm$^3$/hr), was pre-heated to 1,100° C. Separately oxidizing gas which had been prepared by mixing oxygen (4 Nm$^3$/hr) with steam (15 Nm$^3$/hr), was preheated to 1,000° C. The diluted titanium tetrachloride gas and the oxidizing gas, serving as raw material gasses, were fed through a parallel flow nozzle of a reaction apparatus as shown in FIG. 2, and introduced into a quartz-glass-made reactor at velocities of 35 m/second and 50 m/second, respectively. Cooling air was introduced into the reactor such that the residence time of the above gasses in the reactor at a temperature higher than 700° C. was 0.2 seconds. Subsequently, the resultant titanium dioxide powder was collected by use of a Teflon-made bag filter. Thereafter, the powder was heat-treated at 350° C. for one hour. The resultant titanium dioxide powder had a BET specific surface area of 54 m$^2$/g. The rutile content and the anatase content of the powder were 33% and 67%, respectively.

Subsequently, sodium metaphosphate (for food addition, product of Taihei Chemical Industrial Co., Ltd.) (0.5 kg) was added to an aqueous slurry (50 L) containing the resultant powder (900 g) (powder content: 2 wt. %), which was stirred sufficiently until the metaphosphate was dispersed in the slurry.

Separately, calcium chloride (for food addition, product of Tokuyama Corporation) (200 g) was added to pure water (2,000 L) which had been weighed in advance, to thereby prepare a calcium chloride solution.

The above-obtained sodium-metaphosphate-containing titanium dioxide slurry and the calcium chloride solution were mixed together. A 10% sodium hydroxide aqueous solution was added to the resultant mixture to thereby adjust the pH of the mixture to 9, and the resultant mixture was maintained at 40° C. for one hour. The electric conductivity of the mixture was 10,000 $\mu$S/cm. Subsequently, the thus-obtained slurry was washed through filtration by use of a rotary filter press (product of Kotobuki Engineering & Manufacturing Co., Ltd.), and then washed thoroughly with water until the electric conductivity of the filtrate became 50 $\mu$S/cm, followed by concentration under vacuum at 40° C., to thereby obtain a photocatalytic slurry.

The pH of the resultant photocatalytic slurry was measured by use of a pH meter (model: D-22, product of Horiba Ltd.) and found to be 7.8. The zeta potential of the slurry was measured by means of an electrophoresis light-scattering method by use of ELS-8000 (product of Otsuka Electronics Co., Ltd.). The isoelectric point was obtained on the basis of the thus-measured zeta potential and was found to be 2.3.

A powder obtained through drying the slurry was subjected to ICP analysis by use of ICPS-100V (product of Shimadzu Corporation), and Ca (0.15%) and phosphorus (0.3%) were found to be present. The DWA of the powder was 62%.

COMPARATIVE EXAMPLE 1

In a manner similar to that of Example 1, pure water (50 L) which had been weighed in advance was heated to 98° C. with stirring and maintained at this temperature. A titanium tetrachloride aqueous solution (Ti concentration: 15%) (3.6 kg) was added dropwise to the heated water over 120 minutes. The thus-obtained white suspension was concentrated under vacuum at 40° C., and then subjected to dialysis by use of an electric dialyzer, to thereby remove chlorine and adjust the pH of the slurry to 4. The zeta potential of the slurry was measured by means of an electrophoresis light-scattering method by use of ELS-8000 (product of Otsuka Electronics Co., Ltd.). The isoelectric point was obtained on the basis of the thus-measured zeta potential, and was found to be 4.5. A portion of the thus-obtained photocatalytic slurry was collected, and the solid content was measured by means of a dry constant weight method and found to be 10 mass %. The resultant dried powder was subjected to structure analysis by use of an X-ray diffraction apparatus. As a result, the powder was found to be of brookite-type titanium dioxide. The brookite content and the anatase content of the titanium dioxide were 89% and 11%, respectively. The primary particle size of the powder was determined to be 0.015 $\mu$m on the basis of the results of measurement of BET specific surface area. The transmittance of the slurry as measured at a thickness (optical length) of 2 mm and a wavelength of 550 nm was 44%. The DWA of the powder was 11%.

(Preparation of High-Density Polyethylene Masterbatch)

A portion of a photocatalytic slurry obtained in a manner similar to that described above was dried by use of a medium fluidized drier (Slurry Drier, product of Okawara Mfg. Co., Ltd.), to thereby prepare a photocatalytic powder (5 kg). The photocatalytic powder (20 parts by mass), zinc stearate (Zinc Stearate S, product of NOF Corporation) (2 parts by mass), and high-density polyethylene (Jrex F6200FD, product of Japan Polyolefins Co., Ltd.) (78 parts by mass) were melt-kneaded at 170° C. (residence time: about three minutes) by use of a twin-screw extruder (model: PCM30, product of Ikegai Iron Works, Ltd.), and the resultant product was pelletized, to thereby obtain a high-density polyethylene columnar compound (20 kg) containing a photocatalytic powder in an amount of 20% and having a diameter of 2 to 3 mm$\phi$, a length of 3 to 5 mm, and a weight of 0.01 to 0.02 g.

(Spinning)

The above-obtained photocatalytic-powder-containing high-density polyethylene compound (10 kg) and high-density polyethylene (Jrex F6200FD, product of Japan Polyolefins Co., Ltd.) (10 kg) were mixed together for 10 minutes by use of a V-type blender (RKI-40, product of Ikemoto Scientific Technology Co., Ltd.), to thereby prepare composite pellets.

Subsequently, the resultant composite pellets and polyester resin pellets (FM-OK, product of Teijin Ltd.) were fed into a melt extrusion spinning machine (Polymer-Maid 5, product of Chuo Kagaku Kikai Seisakusho), and then spun at a packing temperature of 300° C., to thereby produce 12-denier fiber (35 kg) having a core-sheath structure of photocatalyst-containing high-density polyethylene (sheath)/polyester resin (core), in which the ratio by mass of the photo-functional-powder-containing high-density polyethylene and the polyester resin was 1:1.

(Evaluation of Photocatalytic Activity)

The above-obtained fiber (10 g) was placed in a 5-liter Tedler bag (product of Gastec Corporation) hydrogen sulfide (60 ppm) was fed into the bag, and the bag was sealed. Subsequently, the bag was irradiated with light for six hours by use of a day white fluorescent lamp (High White FL20SS-N/18-B, product of Hitachi GE Lighting, Ltd.) such that the intensity of UV rays of 365 nm was 6 $\mu$W/cm$^2$. Thereafter, the concentration of the hydrogen sulfide was measured by use of a detector tube (No. 4LL, product of Gastec Corporation). After the six-hour irradiation, the concentration of hydrogen sulfide was 12 ppm. The concentration of hydrogen sulfide present in the bag is higher as compared with the case of Example 1. Therefore, the results show that the photocatalytic property of the fiber when irradiated with a day white fluorescent lamp serving as a light source is inferior to that of the fiber of Example 1.

(Weather Resistance Test)

The above-obtained fiber was irradiated with light of 50 mW/cm$^2$ for 24 hours by use of a light fastness tester (SUNSET CPS+, product of ATLAS). After the 24-hour irradiation, considerable yellowing of the fiber was observed.

COMPARATIVE EXAMPLE 2

To pure water (200 L) were added commercially available anatase for pigment (A100, product of Ishihara Sangyo Kaisha, Ltd.) (primary particle size: 0.18 $\mu$m) (10 kg) and sodium metaphosphate (1 kg), and the resultant mixture was stirred sufficiently until the anatase and the metaphosphate were dispersed. Subsequently, calcium chloride (200 g) was added to pure water (2,000 L) which had been weighed in advance, and stirred by use of a laboratory stirrer, to thereby prepare a calcium chloride solution. The above-obtained sodium-metaphosphate-containing titanium dioxide slurry and the calcium chloride solution were mixed together, and the resultant mixture was maintained at 40° C. for four hours. The electrical conductivity of the mixture was 10,000 $\mu$S/cm. The resultant slurry was washed through filtration by use of a rotary filter press, and then washed thoroughly with water until the electrical conductivity of the filtrate became 50 $\mu$S/cm, followed by concentration, to thereby obtain a photocatalytic slurry.

Subsequently, a portion of the thus-obtained slurry was collected, and the solid content was measured by means of a dry constant weight method and found to be 10 mass %. Subsequently, the resultant powder was subjected to FT-IR analysis, to thereby observe the absorption of metaphosphoric acid. Thereafter, the dried powder was subjected to ICP analysis, and Ca (0.2%) and phosphorus (0.4%) were found to be present. The DWA of the powder was 12%. The photocatalytic activity of the powder is lower than that of the powder of Example 1.

COMPARATIVE EXAMPLE 3

Titanium dioxide was obtained in a manner similar to that described in Examples of JP-A-2001-72419. Specifically. a 20% titanium trichloride solution (guaranteed reagent: product of Wako Pure Chemical Industries, Ltd.) (100 g) was stirred in a 300-mL flask in a nitrogen atmosphere and 25% aqueous ammonia (guaranteed reagent: product of Wako Pure Chemical Industries, Ltd.) (141 g) was added dropwise to the titanium trichloride solution over about 30 minutes while the solution was cooled with ice water, to thereby allow hydrolysis to proceed. The resultant sample was washed through filtration, and then dried. Subsequently, the resultant sample was fired at 400° C. in air for one hour, to thereby obtain yellow titanium dioxide particles. The resultant titanium dioxide had an anatase-type crystal structure. The DWA of the titanium dioxide particles was 18%. The photocatalytic activity of the particles is lower than that of the titanium dioxide particles of Example 1.

What is claimed is:

1. A product comprising a film exhibiting photocatalytic property characterized in that, in 5 L of dried air containing 60 ppm hydrogen sulfide, after the film having a surface area of 400 cm$^2$ is irradiated with light for four hours by use of a day white fluorescent lamp such that the intensity of UV rays of 365 nm is 6 $\mu$W/cm$^2$, percent decomposition of the hydrogen sulfide is at least about 20%.

2. A product according to claim 1, wherein the film exhibiting photocatalytic property has a thickness of about 0.01 to about 100 $\mu$m.

3. A product according to claim 2, wherein the film thickness is about 0.01 to about 0.1 $\mu$m.

4. A product according to claim 2, wherein the film thickness is about 1 to about 100 $\mu$m.

5. A product comprising a film exhibiting photocatalytic property according to claim 1, wherein, when transmittance at 550 nm in the absence of a film exhibiting photocatalytic property is represented by "T1%," and transmittance at 550 nm in the presence of the film is represented by "T2%," the product has a portion at which the ratio of T2/T1 is at least about 0.9.

6. A product comprising a film exhibiting photocatalytic property according to claim 1, wherein, when light reflectivity at 550 nm in the absence of a film exhibiting photocatalytic property is represented by "R1%," and light reflectivity at 550 nm in the presence of the film is represented by "R2%," the product has a portion at which the ratio of R2/R1 is at least about 0.9.

7. A product according to claim 1, wherein the film exhibiting photocatalytic property has a pencil hardness of at least 2H.

8. A product according to claim 1, wherein, after the film exhibiting photocatalytic property is irradiated with light for 24 hours by use of a day white fluorescent lamp such that the intensity of UV rays of 365 nm is 6 $\mu$W/cm$^2$, the film has a contact angle of about 20° or less with respect to water.

9. A product according to claim 8, wherein the contact angle with respect to water is about 10° or less.

10. A product according to clam 9, wherein the contact angle with respect to water is about 50 or less.

11. A product according to claim 1, wherein, after the film exhibiting photocatalytic property is irradiated with light for 24 hours by use of a day white fluorescent lamp such that the intensity of UV rays of 365 nm is 6 $\mu$W/cm$^2$, and the n allowed to stand in the dark for 24 hours, the film has a contact angle of about 20° or less with respect to water.

12. A product according to claim 11, wherein, after the film is allowed to stand in the dark for 24 hours, the film has a contact angle of about 100 or less with respect to water.

13. A product according to claim 12, wherein, after the film is allowed to stand in the dark for 24 hours, the film has a contact angle of about 50 or less with respect to water.

14. A product according to claim 1, wherein, after the film exhibiting photocatalytic property is subjected for 4,000 hours to an acceleration-exposure test employing a xenon arc lamp, the film has a yellowing degree of about 10 or less, and after the film is irradiated with light for 24 hours by use of a day white fluorescent lamp such that the intensity of UV rays of 365 nm is 6 $\mu$W/cm , the film has a contact angle of about 20° or less with respect to water.

15. A product according to claim 1, wherein the film exhibiting photocatalytic property is formed on an inorganic substrate.

16. A product according to claim 15, wherein the inorganic substrate is of metal or ceramic.

17. A product according to claim 15, wherein the inorganic substrate is at least one species selected from the group consisting of an Si compound and an Al compound.

18. A product according to claim 1, wherein the film exhibiting photocatalytic property is formed on an organic substrate.

19. A product according to claim 18, wherein the organic substrate is an organic polymer.

20. A product according to claim 19, wherein the organic polymer is at least one species selected from the group consisting of polyethylene, polypropylene, polystyrene, nylon 6, nylon 66, aramid, polyethylene terephthalate, unsaturated polyesters, polyvinyl chloride, polyvinylidene chloride, polyethylene oxide, polyethylene glycol, silicon resin, polyvinyl alcohol, vinylacetal resin, polyacetate, ABS resin, epoxy resin, vinyl acetate resin, cellulose derivatives, urethane resin, polyurethane resin, polycarbonate resin, urea resin, fluorine resin, polyvinylidene fluoride, phenol resin, celluloid, chitin, starch sheet, acrylic resin, melamine resin, and alkyd resin.

21. A product according to claim 20, wherein the cellulose derivatives are at least one species selected from cellulose and rayon.

22. A product according to claim 1, which is at least one member selected from the group consisting of building materials, machinery, vehicles, glass products, electric appliances, agricultural materials, electronic apparatus, tools, tableware, bath products, toiletry products, furniture, clothing, cloth products, fibers, leather products, paper products, sporting goods, futon, containers, eyeglasses, signboards, piping, wiring, brackets, sanitary materials, and automobile parts.

23. A method for imparting photocatalytic property and hydrophilicity to a product as recited in claim 22, wherein a light source employed for causing the product to exhibit photocatalytic property and hydrophilicity is at least one species selected from the group consisting of sunlight, a fluorescent lamp, a mercury lamp, a xenon lamp, a halogen lamp, a mercury xenon lamp, a metal halide lamp, a light-emitting diode, a laser, and flame obtained through combustion of an organic substance.

* * * * *